Aug. 5, 1958 K. A. MARGGRAF 2,846,207
MOTION RESPONSIVE APPARATUS
Filed Jan. 14, 1953 3 Sheets-Sheet 1

Inventor,
Kurt A. Marggraf.
Schroeder, Merriam,
By Hofgren & Brady.
Attorneys.

Inventor.
Kurt A. Marggraf
Schroeder Merriam
By Hofgren & Brady
Attorneys.

Aug. 5, 1958

K. A. MARGGRAF 2,846,207

MOTION RESPONSIVE APPARATUS

Filed Jan. 14, 1953

Inventor:
Kurt A. Marggraf
Schroeder, Merriam,
By Hofgren & Brady.
Attorneys

United States Patent Office 2,846,207
Patented Aug. 5, 1958

2,846,207

MOTION RESPONSIVE APPARATUS

Kurt A. Marggraf, Lemont, Ill., assignor to Ampatco Laboratories Corporation, a corporation of Delaware Application January 14, 1953, Serial No. 331,144

10 Claims. (Cl. 264—1)

This invention relates to motion responsive apparatus, especially apparatus particularly adapted for use in an automatic pilot system.

One feature of this invention is that it provides an improved apparatus for providing an electrical signal as a function of a mechanical motion, as the random motion of an aircraft; another feature of this invention is that it results in improved dynamic behavior of a motion sensing instrument or instruments; yet another feature of this invention is that it provides in such instruments improved means for electrically providing a restoring force for opposing motion responsive movement of an element, and for providing as a function thereof the desired electrical signal, as for autopilot control; still a further feature of this invention is that it is adapted to provide a control signal of substantial amplitude from an extremely small displacement of an osillatable element with a short transient time, thus providing good signal levels in combination with very good dynamic characteristics in motion responsive instruments, as accelerometers and rate gyroscopes used in the automatic pilot systems of aircraft. Other features and advantages of this invention will be apparent from the following specification and the drawings in which:

In an automatic pilot system as used in an aircraft, for example, it is necessary to employ several instruments which sense and are responsive to random movements of the aircraft, and to have these provide signals to the autopilot for effecting a corrective control action of the airplane control surfaces. In order to have an efficient autopilot system it is not only necessary to provide information to the autopilot on the angular deviation of the aircraft from the desired attitude (whether such angular deviation is of pitch, roll, or course), but also to provide signals which are a function of (generally directly proportional to) the angular velocity or first derivative of such deviation; and sometimes it is even desirable to provide signals proportional to the acceleration or second derivative of the change or deviation, whether angular or translational.

Fairly satisfactory arrangements exist for providing adequate signals as a function of the displacement, as by associating displacement gyroscopes with a potentiometer or other suitable means for providing an electrical signal as a function of the displacement. In the provision of rate and acceleration signals, however, design comprises have heretofore been made as between optimum dynamic characteristics of the instrument on the one hand, and signals of suitable amplitude on the other hand.

By utilizing my invention motion responsive instruments (as rate gyroscopes and accelerometers in aircraft autopilot systems) can be designed with extremely good dynamic characteristics and at the same time provide electrical signals having very accurate proportionality to the motion being sensed, and satisfactorily high amplitudes. Generally speaking, I accomplish this by eliminating the springs or similar mechanical damping and restoring means of heretofore known devices, by having the movable instrument element which senses motion comprise a coil in a magnetic field, and by utilizing electrical restoring forces opposing movement of such element and providing the desired signal as a result of motion being sensed.

Figure 1:
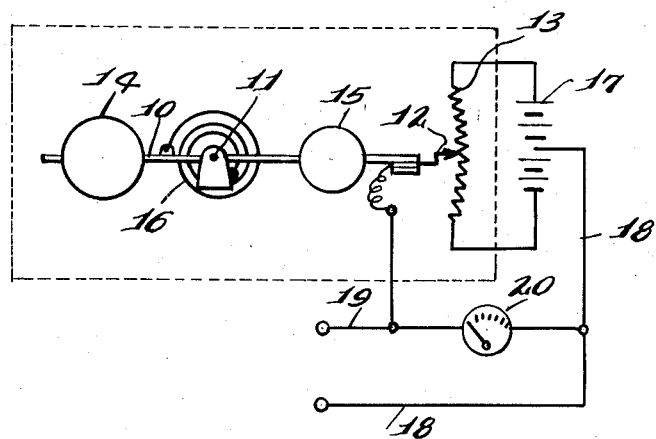
Figure 1 is a schematic illustration, in simplified form, of a conventional accelerometer.

In order to facilitate understanding of the operation of embodiments of my invention hereinafetr to be described, reference is first made to Figure 1 illustrating an extremely simplified angular accelerometer capable of providing a signal, as for utilization in an aircraft autopilot system. A lever arm 10 is centrally pivoted about an axis 11 and carries a wiper arm 12 at one end adapted to make movable contact with the resistance element 13 of a potentiometer. Weights 14 and 15 are so related that the entire movable assembly is mechanically balanced about the axis 11; and a spring 16 tends to resist rotation of the arm 10 in either direction, and provides a restoring force returning the arm to its neutral or zero position in the absence of a motion of the type being sensed. Because of the balanced arrangement, the instrument would be responsive only to angular acceleration in either direction about the axis 11; i. e., for example, to roll of the aircraft in either direction if the axis 11 coincides with the longitudinal axis of the airplane. It will be obvious that if one weight were removed and the spring put under tension or compression to balance the effect of the other weight, the instrument would be responsive not only to angular acceleration but also to translational acceleration, as a sharp drop of the ship in a down-draft.

Turning now to the means for providing an electrical signal, it will be seen that a source of electrical power, indicated diagrammatically as a battery 17, is connected to opposite ends of the potentiometer resistance element 13 and has its center point connected to the wire 18; whereas a movable arm or wiper element 12 of the potentiometer is connected through suitable means to the wire or lead 19. When the instrument is properly adjusted to its zero position, and is not being affected by any motion to be sensed, the leads 18 and 19 are both at what may be termed the center or zero voltage condition and there is no voltage differential between them. On the other hand, in the example being described as illustrative, roll of the ship in such a direction as to tend to cause the weight 15 to move upwardly causes the potentiometer arm to move upwardly on the resistance element 13, and the resulting difference in potential between the leads 18 and 19 is capable of providing a signal to the autopilot system which is a function of the acceleration. A voltmeter 20 may provide a visual indication of this acceleration change if desired. It will be understood, however, that such an accelerometer does not have good dynamic characteristics, particularly in that if the spring 16 is made strong to minimize the transient motion of the arm it is difficult to obtain an electrical signal of satisfactory amplitude; and other factors, as variation in friction due to wide variation in temperature, additionally render the signal something different from the true proportionality desired.

Figure 2:
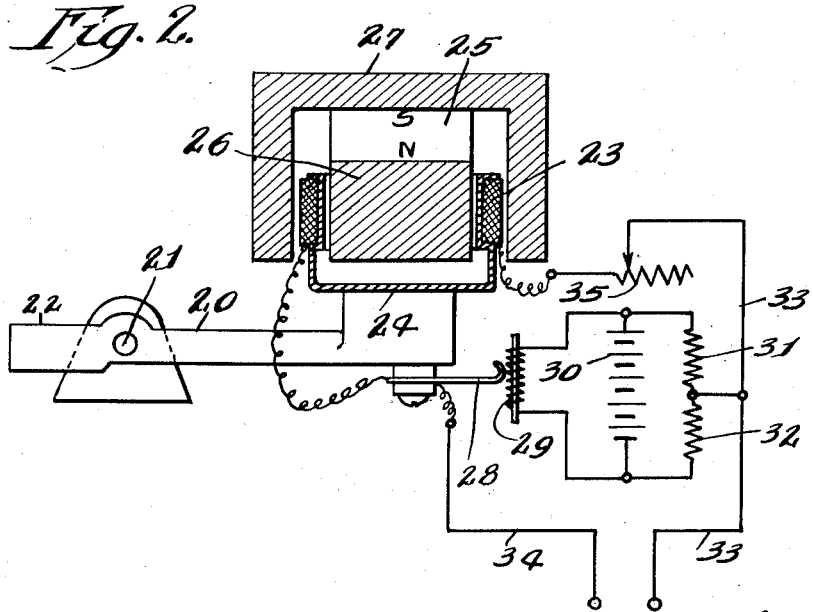
Figure 2 is a view, partly schematic and partly in section, of another simple form of angular accelerometer.

Referring now more particularly to Figure 2, another simple angular accelerometer in some respects analagous to that heretofore described. In this accelerometer, the lever 20 is pivotally mounted about the axis 21, a counterweight 22 providing a mechanically balanced condition of the movable parts. At its right hand end (speaking with respect to the position of the parts as shown in the drawing) the lever 20 carries a coil 23 suitably mounted thereon, as on an aluminum cup 24. The coil 23 is mounted in a permanent magnetic field here shown as provided by a magnet 25 of suitable material, such as Alnico. An inner cylindrical member 26 and an outer cup-like member 27 having a cylindrical portion concentric therewith provide a core structure permeable material (as soft iron) with an annular gap in which the coil 23 may move (vertically as illustrated in the drawings) in a relatively strong magnetic field.

The end of the arm also carries the movable element of a potentiometer, here illustrated as the wiper-arm 28 associated with the resistance element 29. A source of power illustrated as the battery 30 is connected to opposite ends of the resistance element 29 and to a voltage divider comprising resistors 31 and 32 of equal value. The lead 33 is connected to the center point of the voltage divider resistors and the lead 34 is connected to the movable element or wiper arm 28 of the potentiometer. This arm is also connected to one terminal or end of the coil winding 23, the other end being connected through the variable resistor 35 to the lead 33. The direction of winding of the coil 23 is so related to the direction of field flux across it that an upward movement of the coil and wiper-arm causes current flow through the coil in a direction tending to oppose such movement and restore it to a zero position; and a downward movement of the coil and wiper-arm causes current flow through the coil in a reverse direction, again opposing such movement and tending to restore the movable elements to their zero position. Any movement of the arm 20 and coil 23 as a result of the aircraft motion being sensed by this accelerometer thus results in a wiper-arm movement creating a current flow in the coil opposing such movement and tending to restore it to zero position; and at the same time creates a potential difference between the leads 33 and 34 which may be used as a signal for effecting autopilot operation.

Figure 3:
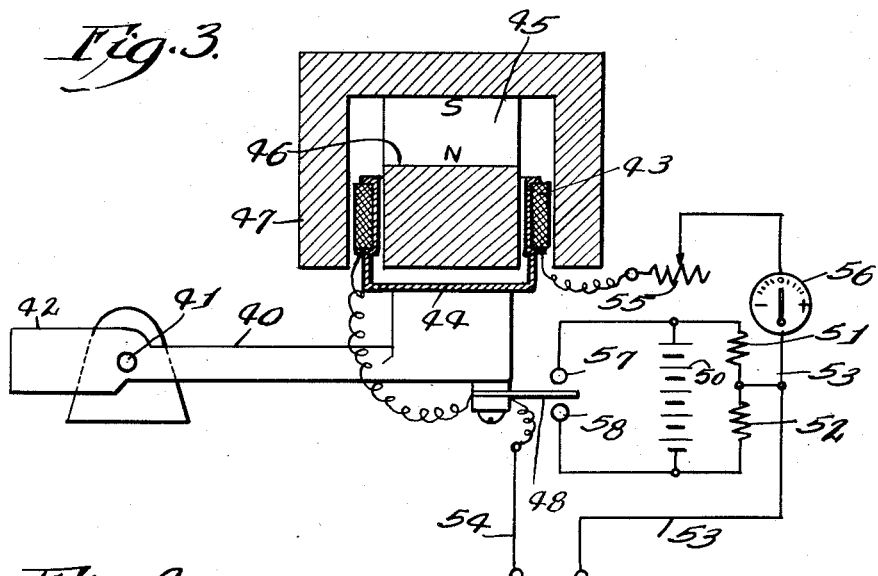
Figure 3 is a view similar to Figure 2, but illustrating an improved embodiment of my invention.

The instrument just described, however, has the disadvantage of still using a potentiometer, not only providing undesired additional friction, but also presenting difficulties in deriving a voltage variation of sufficient amplitude from an extremely small wiper-arm movement; and my invention, as illustrated in Figure 3 and subsequent figures, obviates these disadvantages. In the form of my invention illustrated in Figure 3, a counterweighted arm 40 pivotally mounted about the axis 41 again carries at one end a coil 43 suitably supported (as by the aluminum cup 44) in a magnetic field existing between the inner and outer cylindrical core structure portions 46 and 47 providing a magnetic circuit for the permanent magnet 45. Numbers twenty higher than those employed in the description of Figure 2 are being utilized in order to shorten the description and enable ready reference back to earlier portions of the description in this specification if desired. One end of the coil is connected to the movable arm or member 48 of contact means to be hereinafter more fully described, and to the lead 54; and the other end of the coil is connected through the variable resistor 55 to the lead 53 (through an ammeter 56 for visual indication if desired). The lead 53 is again connected to the central point of a voltage divider comprising the resistances 51 and 52 supplied with power from the source illustrated as a battery 50. In my invention as here illustrated, the potentiometer is replaced by a contact means wherein the arm 48 comprises a movable contact member adapted to engage either of two fixed contacts 57 and 58, these fixed contacts being connected to opposite ends of the battery 50.

Close spacing of the contacts 57 and 58 relative to the intermediate contact member 48 enables reduction of the transient motion of the movable element to very small limits; and the transient movement can be reduced to a very small time factor by oscillating the coil at a rapid rate as, for example, of the order of 100 cycles per second. With a frequency of oscillation of this order, the period of one oscillation is extremely small, and the accelerometer has very good dynamic behavior since any change in acceleration during one period of oscillation is necessarily small because of the small duration of the period. The winding direction and voltage connections would be such that when the arm 48 engages the contact 57 the current flows through the coil 43 in a direction tending to move it downwardly (as viewed in the drawing) and when this electrical action has caused the coil and arm to move downwardly sufficiently to bring the contact member 48 into engagement with the fixed contact 58 a reverse flow takes place in the coil moving it upwardly. This results in rapid oscillation of the coil within narrow ranges of mechanical movement at a frequency depending upon the design of the instrument and yet makes a full half of the battery voltage appear alternately and oppositely between the leads 53 and 54.

Figures 4, 5:
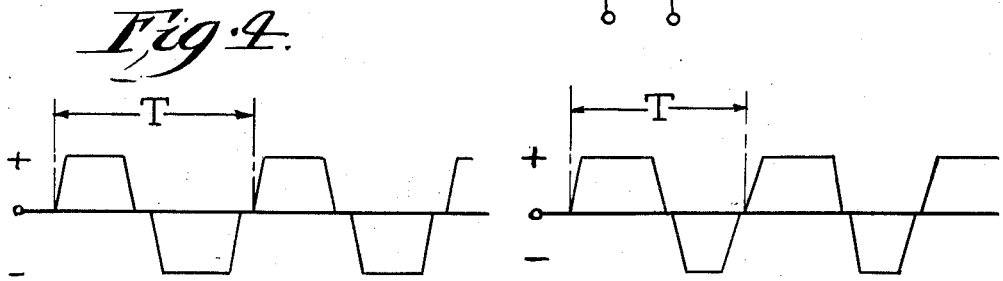
Figure 4 is a curve illustrative of the current-time relationship in the coil and output leads of the instrument illustrated in Figure 3 when it is not affected by any acceleration.
Figure 5 is a curve illustrative of a current-time relationship occurring as a result of the instrument sensing an angular acceleration.

In the absence of any effect on the instrument by a motion to be sensed, the positive and negative pulses through the coil and present in the leads 53 and 54 are equal and opposite and the resultant effective signal voltage in the leads 53 and 54 would be zero. This situation is illustrated in Figure 4. A motion of the ship tending to cause the coil and associated parts of the movable element to move upwardly as viewed in the drawings, however, would result in a longer dwell of the arm 48 on the contact 57 than on the contact 58, and provide the necessary electrical opposition or restoring force; and this would result in positive pulses of greater duration than the negative pulses as illustrated in Figure 5, resulting in the presence in the leads 53 and 54 of a positive signal voltage accurately proportional to the effect of the motion being sensed. Similarly, if the motion of the ship were opposite, the negative pulses would exceed the positive pulses in duration due to the difference in contact relationships or dwell, and a suitable corrective signal would then be applied to the autopilot.

Analysis of the operation has shown that the signal current available from such an instrument remains truly proportional to the angular acceleration to which it is exposed even after the force is so great that the movable contact arm no longer reaches one of the fixed contacts, up to the point where it stays permanently in contact with the other contact member. This level can be made outside of the range of any acceleration to which the instrument may be exposed by adjustment of the amount of current flow through the coil by variation in the resistance 55 illustrated as variable, or by selection of a suitable fixed resistance in the design of the instrument. The result is an instrument which provides not only extremely good dynamic behavior with high signal amplitudes for effecting operation of the autopilot, but which also maintains a very accurate proportionality between the electrical signal and the entire range of the force to which the instrument is exposed.

Since optimum dynamic characteristics require close setting of the fixed contacts 57 and 58 to the movable contact member 48 illustrated in Figure 3, the presence of dirt, pitting, or other factors might result in bridging between the contacts 57 and 58 and a resultant short across the battery 50. An alternative form of circuit avoiding this difficulty is illustrated in Figure 6.

Figure 6:
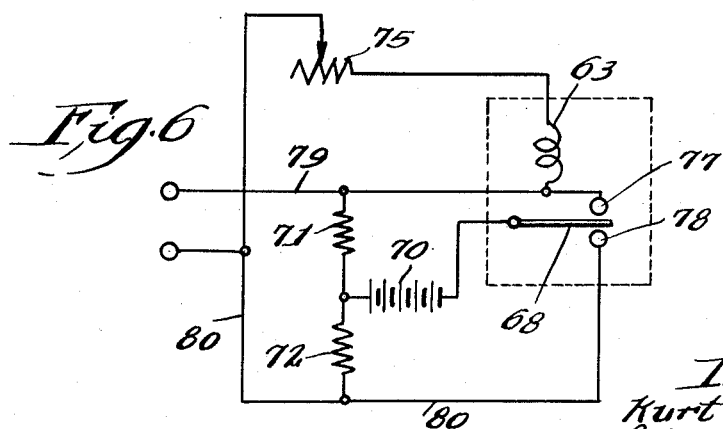
Figure 6 is a circuit diagram of a modified form of my invention.

In the circuit of Figure 6, reference numerals twenty higher than those used in the description of the device illustrated in Figure 3 are employed. In this circuit, the movable contact member 68 is adapted to oscillate between the fixed contacts 77 and 78. One side of the coil 63 is connected to the lead 79 connected to the fixed contact 77 and the other side of the coil 63 is connected through the variable resistance 75 to the lead 80 connected to the fixed contact 78. Resistors 71 and 72 are connected in series between the leads 79 and 80; and the battery 70 is connected from the midpoint between these resistors to the movable contact member 68. In this circuit oscillation of the contact member 68 between the fixed contacts 77 and 78 again effects current reversal through the coil 63, with variation in the contact relationships due to motion effective on the instrument again properly varying the electrical restoring force and the signal through the leads 79 and 80. However, any accidental bridging across from contact 77 to contact 78 no longer places a direct short on the battery 70, the resistors 71 and 72 instead being in series in any such undesired circuit.

Figure 7:
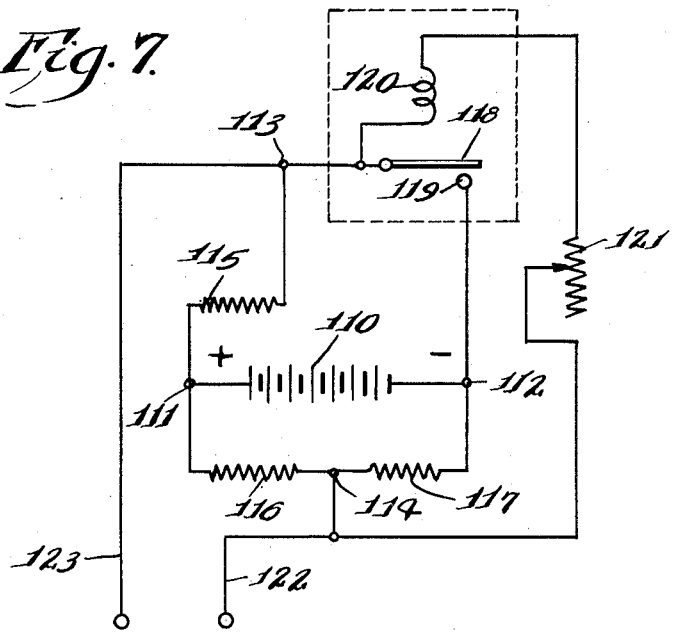
Figure 7 is a circuit diagram of a preferred embodiment of my invention.

My preferred circuit, however, obviates the use of a second fixed contact entirely, such a circuit being illustrated in Figure 7. This circuit is arranged on the Wheatstone bridge principle with the battery 110 being connected between two corners of the bridge (the points 111 and 112) and the electrical restoring force and signal energy being provided at the other two corners of the bridge (the points 113 and 114). Resistors 115, 116 and 117 provide three arms of the bridge circuit; and the fourth arm comprises the contact means consisting of the movable contact member 118 and the single cooperating fixed contact 119, opening and closing of these contacts resulting in a substantially instantaneous change from substantially zero resistance to substantially infinite resistance in that arm of the bridge. The coil 120 would again be movable within a magnetic field as a part of the element affected by the motion to be sensed, and movement of the element would effect movement of the contact member 118.

When the contacts are closed, current would flow in one direction through the coil 120 and variable resistor 121, and when the contacts are open current would flow in the reverse direction through the coil. This would result in an instantaneous reversal of current through the coil by a change of the contact members between open and closed relationship, so that there would no longer be an intermediate "no current" period between opposed current pulses as existing in the earlier forms and was illustrated in Figures 4 and 5. Moreover, differences in amplitude of current flow through the coil are readily automatically compensated for by differences in the length of the open period with respect to the closed period of the contact means, so that the effective signal current at the output leads 122 and 123 would be zero in the absence of a motion to be sensed even though the resistances comprising the arms of the bridge were not identically balanced; and yet variations in contact relationship as a result of the motion being sensed would again provide a properly proportionate effective signal.

Figure 8:
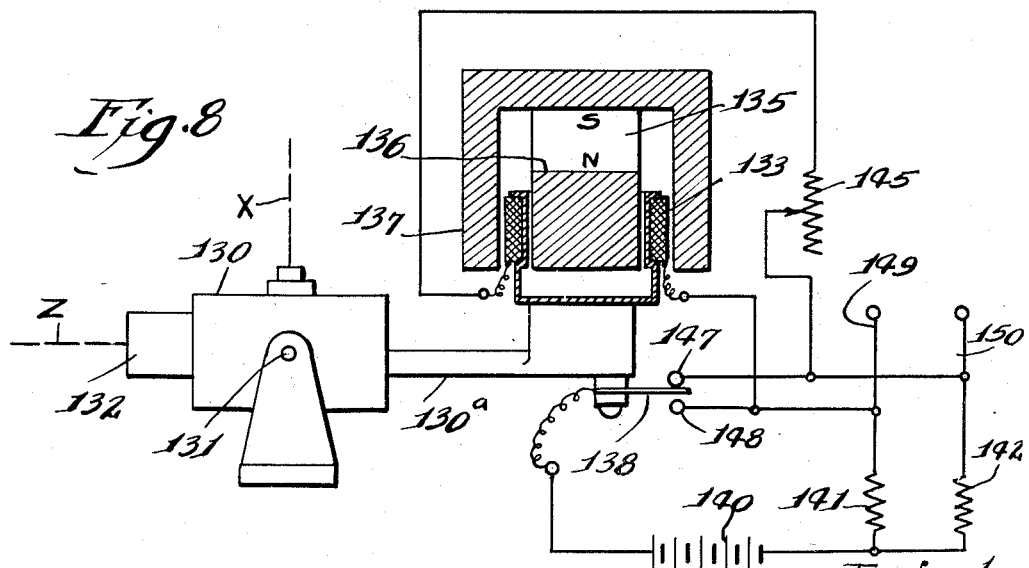
Figure 8 is a combined circuit and schematic view of my invention applied to a rate gyro.

While the foregoing embodiments heretofore described have all related to accelerometers it is to be understood that my invention is also particularly adapted for use with a rate gyro. Referring now more particularly to Figure 8, a gyroscope case 130 houses a conventional gyroscope high speed rotary element, and is itself pivotally mounted about the axis 131. An arm 130a carries a coil 133 and a movable contact arm 138. A battery 140 is connected through resistors 141 and 142 to the fixed contacts 147 and 148, and to the output leads 149 and 150. In this embodiment of my invention the winding 133 has one terminal connected to the lead 149 and to the fixed contact 148 and the other terminal connected through the variable resistance 145 to the lead 150 and the fixed contact 147; and the movable contact member 138 is connected directly to one side of the battery 140. Contact of the member 138 with contact 147 results in current flow in one direction through the coil 133, tending to move the elements in such a direction as to bring contact member 138 into contact with the other fixed contact, reversing current flow through the coil. Since numbers ninety higher than those used in the description of Figure 3 have been employed, reference thereto may be had for a fuller understanding of other portions of the device if desired. It will be understood that the coil will oscillate and any motion effective thereon will be opposed by an electrical restoring force, and will provide a desired signal output between the leads 149 and 150. In the case of a rate gyro, as is well known, the rotation being sensed does not take place about the axis 131 but instead about an axis normal thereto, as the axis Z, the precessional characteristic of the gyroscope results in a torque about axis 131 which is proportional to the aircraft angular velocity about axis Z, assuming that the rotary member of the gyroscope is rotating within the casing about axis X. This torque is then effective upon the coil and movable contact member 138 to tend to move them in a given direction, as for example upwardly as the parts are viewed in the drawing; whereupon variations in the contact relationships result in an electrical restoring force opposing this motion and in the provision of the desired signal from the output leads 149 and 150.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A motion sensing instrument for an automatic pilot system, including: a movably mounted element movable as a function of the motion desired to be sensed; electromagnetic means opposing any such movement of the element, the opposition being constant for any movement of said element, said electromagnetic means also effecting oscillation of the element; and means for deriving an electrical signal as a function of such motion.

2. A motion-sensing instrument or an automatic pilot system, including: a movably mounted element movable as a function of the motion desired to be sensed; electromagnetic means for driving said element in opposite directions with a force independent of the position of said element for oscillating such element and for opposing variations in such oscillation; and means for deriving an electrical signal as a function of variations in such oscillations resulting from the motion desired to be sensed.

3. A motion-sensing instrument for an automatic pilot system, including: a movably mounted element movable as a function of the motion desired to be sensed, this element comprising a coil in a substantially uniform magnetic field; electrically operated means for oscillating such element and for opposing variations in the normal oscillatory movement thereof, this electrical means including contact means made and broken in accordance with the oscillations of such element in circuit with a source of power and said coil for establishing and reversing current flow therethrough, said current flow reacting with the flux of the magnetic field to produce a driving force independent of the position of the coil during such current flow; and means for deriving an electrical signal as a function of variations in the contact make and break relationships resulting from the motion desired to be sensed.

4. Apparatus of the character claimed in claim 3, wherein the normal oscillation, in the absence of motion desired to be sensed, is of the order of one hundred cycles per second.

5. Apparatus of the character claimed in claim 3, wherein the contact means comprises a single movable contact member oscillatable between two fixed contacts.

6. Apparatus of the character claimed in claim 3, wherein the contact means consists of one movable and one fixed contact member and the circuit is a bridge circuit with the contact means in one arm thereof.

7. A motion sensing instrument, including: a movably mounted element movable as a function of the motion desired to be sensed, this element comprising a coil in a uniform magnetic field; electrically operated means for oscillating such element and for opposing variations in the normal oscillatory movement thereof, this electrical means including contact means made and broken in accordance with the oscillations of such element in circuit with a source of power and said coil for establishing and reversing current flow therethrough, said current flow reacting with the flux of the magnetic field to produce a driving force independent of the position of the coil during such current flow; and means for deriving an electrical signal as a function of variations in the contact make and break relationships resulting from the motion desired to be sensed, such signal being symmetrical for motion in opposite directions and varying linearly with the velocity of such motion.

8. Apparatus of the character claimed in claim 7, wherein the normal oscillation, in the absence of motion desired to be sensed, is of the order of one hundred cycles per second.

9. A motion sensing instrument comprising: a movably mounted element movable as a function of the motion desired to be sensed and including a coil; magnet means providing a uniform magnetic field in which said coil moves; a source of power; means connecting said source of power to said coil for establishing and reversing current flow therethrough, said current flow reacting with the flux of the magnetic field to produce a driving force independent of the position of the coil during such current flow; and means for deriving a signal as a function of the motion to be sensed.

10. A motion sensing instrument comprising: a movably mounted element movable as a function of the motion desired to be sensed and including a coil; magnet means providing a uniform magnetic field in which said coil moves; a source of power; means connecting said source of power to said coil for establishing and reversing current flow therethrough to oscillate said element and to oppose variation in the normal oscillatory movement thereof, said current flow reacting with the flux of the magnetic field to produce a driving force independent of the position of the coil during such current flow; and means for deriving from said circuit a signal as a function of the variation in the oscillation of said element resulting from the motion to be sensed.

References Cited in the file of this patent

UNITED STATES PATENTS

| | | |
|---|---|---|
| 618,702 | Mason | Jan. 31, 1899 |
| 1,826,024 | Roller | Oct. 6, 1931 |
| 1,936,321 | Ambronn | Nov. 21, 1933 |
| 2,049,129 | McNeil | July 28, 1936 |
| 2,136,809 | Uehling | Nov. 15, 1938 |
| 2,328,337 | Hanchock | Aug. 31, 1943 |
| 2,591,921 | Cosgriff et al. | Apr. 8, 1952 |